United States Patent [19]

Syracuse

[11] Patent Number: 5,990,788
[45] Date of Patent: Nov. 23, 1999

[54] TESTER FOR AUTOMOTIVE TRAILER LIGHT SYSTEMS

[76] Inventor: Carmelo R. Syracuse, 25 Holiday Harbor, Canandaigua, N.Y. 14424

[21] Appl. No.: 09/163,208

[22] Filed: Sep. 29, 1998

Related U.S. Application Data

[60] Provisional application No. 60/061,966, Oct. 14, 1997.

[51] Int. Cl.⁶ .................................................. B60Q 1/26
[52] U.S. Cl. ........................ 340/458; 340/431; 340/641; 340/687; 340/691.4; 324/504; 324/542; 439/35; 439/639
[58] Field of Search ..................................... 340/431, 458, 340/641, 687, 691.4; 324/504, 542; 439/35, 639

[56] References Cited

U.S. PATENT DOCUMENTS

| | | | |
|---|---|---|---|
| 3,428,888 | 2/1969 | Nolte | 324/504 |
| 3,663,939 | 5/1972 | Olsson . | |
| 4,430,637 | 2/1984 | Koch-Ducker et al. . | |
| 4,547,722 | 10/1985 | Sarlo . | |
| 4,842,524 | 6/1989 | Hopkins et al. . | |
| 4,866,390 | 9/1989 | Butchko | 340/458 |
| 4,884,032 | 11/1989 | LaPensee . | |
| 5,030,938 | 7/1991 | Bondzeit | 340/458 |
| 5,086,277 | 2/1992 | Hammerly | 340/431 |
| 5,095,276 | 3/1992 | Nepil | 324/504 |
| 5,184,960 | 2/1993 | Hopkins et al. . | |
| 5,192,912 | 3/1993 | Lemon . | |
| 5,602,482 | 2/1997 | Gutierrez | 340/431 |
| 5,604,439 | 2/1997 | Walkington et al. | 340/431 |

*Primary Examiner*—Daniel J. Wu
*Attorney, Agent, or Firm*—Eugene Stephens & Associates

[57] ABSTRACT

The tester includes mating electrical connectors which permit the tester to be positioned between the respective plugs of the respective electrical cables running between a towing vehicle and from a trailer. The container for the tester preferably has magnetic strips along its bottom surface to permit temporary attachment to either the tongue of the trailer or the rear of the towing vehicle. The essential features of the tester are limited to only two simple single-pole/double-throw switches, positioned in tandem, and three diodes arranged as a simple "OR" gate in combination with an audio signal device. This simple circuitry permits a single operator to check (a) the integrity of the wiring harness connected to the towing vehicle's lighting circuits, without leaving the driver's seat of the towing vehicle, and (b) the integrity of the trailer lighting with two simple switch adjustments. Means are also provided for checking for a bad ground connection, and an auxiliary power supply can be used with the tester to permit checking of trailer lighting circuits without the presence of a towing vehicle.

14 Claims, 2 Drawing Sheets

TESTER FOR AUTOMOTIVE TRAILER LIGHT SYSTEMS

This application claims the benefit of U.S. Provisional Application No. 60/061,966, filed on Oct. 14, 1997, which provisional application is incorporated by reference herein.

TECHNICAL FIELD

This invention relates to the testing of the interconnected lighting systems shared by an automotive trailer vehicle and its related trailer-towing vehicle.

BACKGROUND

Trailers of various sizes and forms, e.g., box trailers, covered vans, boat trailers, mobile homes, etc., are connected behind various types of automotive trailer-towing vehicles, e.g., tractors, small trucks, recreational vehicles, and automobiles. Governmental regulations require that such trailers be provided with lighting systems similar to those required on the trailer-towing vehicle, namely, running lights to illuminate the trailer for night operation as well as special lighting for both day and night use to indicate the direction of intended turns as well as the application of brakes. The electrical connection between the towing vehicle and the trailer is made by means of appropriate cables connected by mating male/female plugs.

In order to assure that the lights of the trailer respond appropriately to the lighting signals initiated by the driver of the trailer-towing vehicle, testing of the interconnection of the two lighting systems is necessary. Normally, such testing requires two people, namely, one person to initiate the various light signals in sequence from the towing vehicle and a second person to view the lights of the trailer and towing vehicle to determine whether or not the operation of the two lighting systems is in correct correspondence. If a second person is not available, a lone individual must first initiate the lighting signals from the driver's seat of the towing vehicle one at a time, getting out of the towing vehicle and moving behind the vehicle and trailer to check the proper operation of each signal. While this latter method is particularly time-consuming, it is also extremely difficult to test the operation of the braking lights, since a means must be devised to hold down the brake pedal of the towing vehicle when the lone tester leaves the driver's seat and moves back to check the operation of the lights that must properly indicate each application of the towing vehicle's brakes.

Therefore, in recognition of this problem and its important relation to highway safety, many different testing arrangements have been devised to determine the proper operation of such automotive trailer light systems. All such prior art testing apparatus known to me is relatively complex and expensive. Most prior art devices include a plurality of switches and test lights, one respective switch and one respective test light for each of the separate lighting control circuits, and some known testers even include "flasher" units for activating the lamps used for directional indications. My tester is much less expensive and simpler to make and easier to operate.

SUMMARY OF THE INVENTION

The tester according to the invention, like most prior art testers, includes mating electrical connectors which permit the tester to be positioned between the respective plugs of the respective electrical cables running from the towing vehicle and from the trailer. Preferably, the container for the tester includes magnetic strips on its bottom surface, permitting the tester to be temporarily attached to either the tongue of the trailer or the rear of the towing vehicle. However, as different from known testers, instead of a complex arrangement of switches and test lights relating to each of the respective lighting circuits (e.g., running lights, directional lights, stop lights), the invention includes only two simple single-pole/double-throw switches along with a plurality of diodes arranged as a simple "OR" gate in combination with an audio signal device.

The two switches are in tandem, the first switch being movable to either a first position for testing the signals initiated by the towing vehicle or a second position for testing the integrity of the trailer lighting system.

It is assumed that the lighting circuits of the trailer-towing vehicle are in proper operation as required by governmental regulations. That is, the tester of the invention is not intended to directly check the integrity of the trailer-towing vehicle's electrical system. Rather, the tester of the invention is intended to check the integrity of the wiring of the towing vehicle's cable (i.e., the electrical harness) being used to deliver the vehicle's lamp operating signals to the lighting system on the trailer. When the first switch is positioned to check the towing vehicle's cable, the individual running the test can sequentially check the operation of all of the lighting circuits of the towing vehicle without leaving the driver's seat of the towing vehicle, because the tester according to this invention provides an audible signal to indicate that each respective electrical signal is being properly transmitted through the towing vehicle's cable. That is, it is not necessary that the person running the test get out of the vehicle to determine whether or not each respective signal is being properly carried to the trailer by the towing vehicle's cable, since the integrity of each lighting circuit is confirmed by an audible signal produced by the tester.

When the tester's first switch is set to check the trailer's lighting circuits, the person operating the tester places the tester's second switch in a first position which connects the towing vehicle's power supply to the running lights of the trailer. When the second switch on the tester is moved to its alternate position, the stop/directional lights of the trailer are energized by the towing vehicle's power supply.

In a further embodiment of the tester, an auxiliary power supply unit may be substituted for the power system of the towing vehicle so that the tester can be used to check the operability of the trailer's lighting system without actually connecting the trailer to a towing vehicle.

DRAWINGS

DETAILED DESCRIPTION

Figure 1:
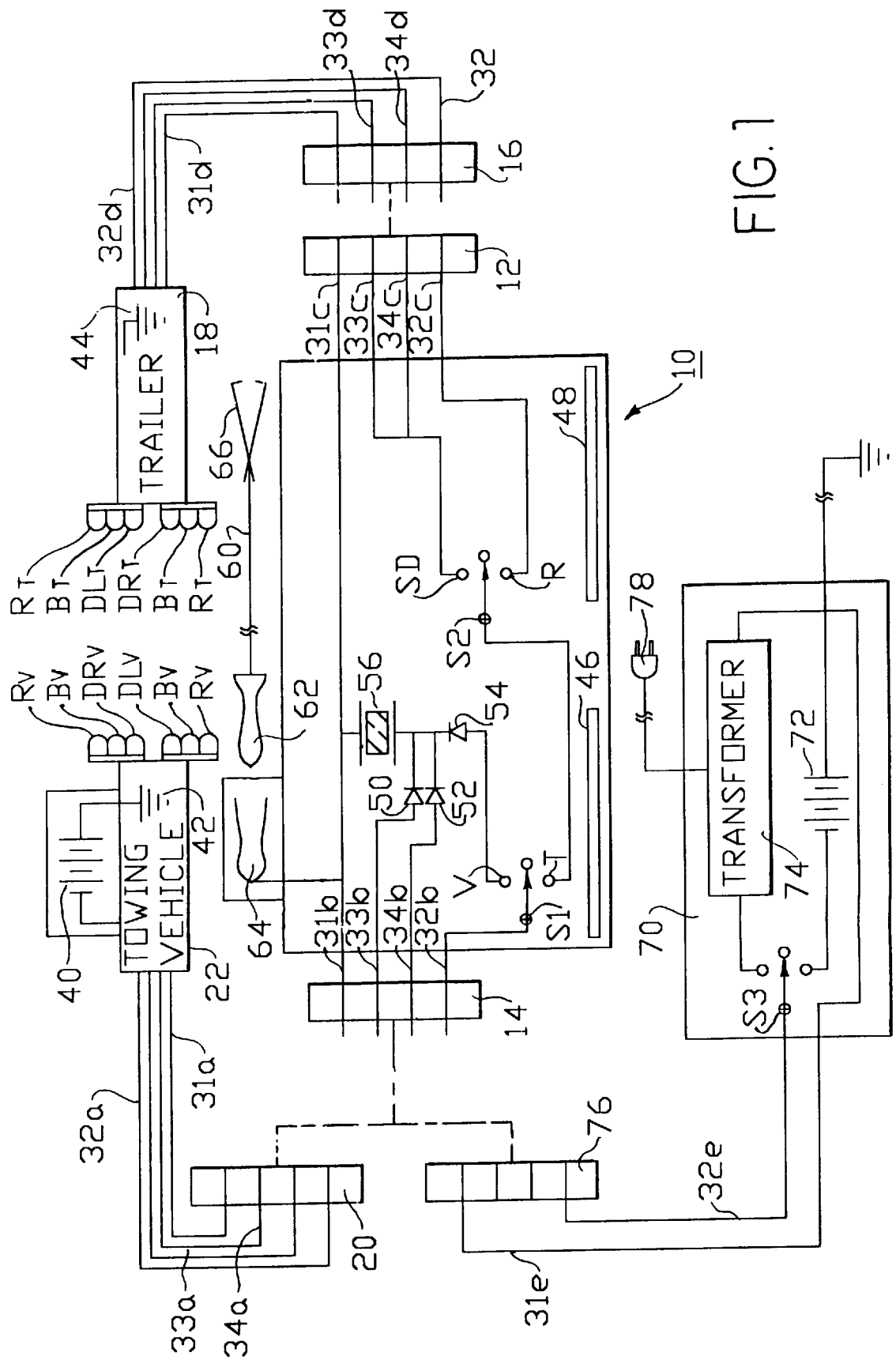
FIG. 1 is a schematic combination block diagram and electrical circuit drawing of the invention, showing the tester interconnecting a trailer with either (a) a towing vehicle or (b) a supplementary power source.

As illustrated schematically in the drawing, a tester 10 according to the invention includes a pair of respective electrical connectors 12 and 14. As illustrated, connector 12 is a female plug adapted to mate with male connector 16 at the end of a cable emanating from trailer 18, while connector 14 is a male-type plug adapted to connect with female connector 20 which forms the end of the electrical cable from towing vehicle 22.

Towing vehicle 22 has two sets of "tail" lamps, each set being indicated symbolically in the drawing as comprising three separate light units, namely, running lights $R_V$ for night-time operation of the vehicle; brake lights $B_V$ for indicating when the brake pedal of the pulling vehicle is activated; and respective left and right directional lights $DL_V$, $DR_V$ for indicating the intention of the vehicle to turn left or right. However, while each tail lamp set is symbolically shown as if it were three separate lights, those skilled in the art will appreciate that all three of these separately indicated lights may be incorporated in a single standard automotive tail lamp, the running lights $R_V$ being one filament of the standard lamp, while the brake and directional lights (e.g., $B_V$ and $DL_V$) can be merely a second separate filament within the same standard lamp. Nonetheless, each of these respective separate lights is operated in a separate circuit including wires delivering current from the vehicle's battery 40, and each separate light is also in series with the vehicle's common ground 42 in the manner well-known in the art.

Trailer 18 includes a similar set of running lights $R_T$, brake lights $B_T$, and respective left and right directional lights $DL_T$ and $DR_T$. The trailer lights, like those on the towing vehicle, are also in series with a common ground 44 on the trailer. Under normal trailer-towing operations, the just-described lighting circuits for the towing vehicle are connected with the lights on the trailer through respective electrical cables interconnected by mating electrical plugs 16 and 20.

When the wires of the electric cables of towing vehicle 22 and trailer 18 are respectively interconnected by mating electrical plugs 16 and 20, they are connected to the respective lighting circuits of towing vehicle 22 as follows: (a) Wire 32a is connected with the circuit controlling running lights $R_V$ and mates with wire 32d which is in circuit with trailer running lights $R_T$; (b) wire 33a connects to the circuits controlling both left braking light $B_V$ and left directional light $DL_V$, connecting, through mating plugs 16 and 20, to wire 33d in the trailer cable which is in circuit with left braking light $B_T$ and left directional light $DL_T$; and (c) wire 34a is connected to the circuits for controlling both right brake light $B_V$ and right directional indication light $DR_V$, being connected to wire 34d in the trailer cable and, in turn, connecting with the right hand brake light $B_T$ and right directional light $DR_T$. The respective cables also include a further respective pair of wires 31a and 31d which serve to connect the common grounds 42 and 44 of both vehicles.

When it is desired to check the operation of this trailer lighting system just described above, tester 10 is interposed between vehicle 22 and trailer 18. That is, connector 20 at the end of the vehicle cable is plugged into connector 14 of tester 10, while connector 16 at the end of the trailer cable is plugged into connector 12 of tester 10. [NOTE: As indicated schematically in the drawing, tester 10 is provided with an attachment assembly for permitting tester 10 to be attached, to either the trailer or the trailer-towing vehicle, to facilitate hearing the audible signals. In preferred embodiments, the bottom surface of the container for tester 10 is provided with magnetic strips 46, 48, permitting the tester to be attached magnetically to either the tongue of trailer 18 or the rear of vehicle 22 in a position selected to facilitate hearing the audible signals emanating from tester 10.]

While wires 31b and 31c of tester 10 serve to interconnect the common ground connections between the two vehicles, wires 33b and 34b are each directed through respective diodes 50 and 52 which, along with diode 54, act to isolate each of these respective circuits from each other and which, at the same time, cooperate to form an electrical OR gate which is in circuit with an audio signal device 56 (e.g., an electric horn, buzzer, bell, or piezoelectric sound generator). Wire 32b connects the towing vehicle's running light circuit with a first single-pole/double-throw switch $S_1$ in the tester. When switch $S_1$ is moved to contact pole T, the running light circuit of vehicle 22 is connected through to a second single-pole/double-throw switch $S_2$.

When tester 10 is positioned as just indicated between the electric cables connecting vehicle 22 and trailer 18, its operation is as follows:

The operator must first determine that the cable carrying the signal from the towing vehicle is properly connected. To do this, switch $S_2$ is left in its neutral position as indicated, while switch $S_1$ is moved to contact pole V. The operator then enters towing vehicle 22 and turns on the ignition. Next, the brake pedal of vehicle 22 is depressed, energizing brake lights $B_V$ and, at the same time, energizing wires 33a and 34a of vehicle 22; and this in turn energizes wires 33b and 34b of tester 10, allowing current to pass through diodes 50 and 52 through audio signal device 56 and back to the vehicle ground 42 through wires 31b and 31a. This produces an audio signal to inform the operator that a braking signal has been properly delivered through the cable of towing vehicle 22. However, as indicated above, diodes 50 and 52 are in an OR gate arrangement so that the audible signal would be initiated if only one of the two brake light circuits were operating. Therefore, the following procedures are necessary to confirm that both brake-light signals are functioning.

Next, after releasing the brake pedal, the operator throws the switch for energizing the left turn flasher of vehicle 22, thereby intermittently energizing only wires 33a, 33b, to deliver current through only diode 50. If this circuit is operating properly, this results in an intermittent audible signal from signal device 56. If this signal is received, the operator then knows that the lamp circuit used for indicating braking and left turns is being properly energized by the vehicle's circuitry. Similarly, the operator next turns on the signal for energizing the right turn flasher, sending intermittent current through wires 34a and 34b as well as diode 52, and again, if the circuit is properly energized, intermittently energizing signal device 56 to provide an intermittent audible signal.

In the final step in this procedure for testing the proper operation of the wiring from vehicle 22, the operator turns off the ignition key and turns on the towing vehicle's parking lights. This energizes wire 32a, delivering current through wire 32b to switch $S_1$ and its contact V and through diode 54 to audio signal device 56. An audible signal from device 56 indicates to the operator that the circuit for operating running lights $R_V$ of the vehicle 22 is energized. Of course, this also indicates to the operator that, in this condition, switch $S_1$ is being energized by battery 40 of vehicle 22.

At this point the operator has learned, without leaving vehicle 22, that all of the light systems of vehicle 22 are being properly transmitted through the towing vehicle's cable and its connector plug 20. Of course, if any of the tested circuits are not operating properly, repairs should be made. If none of the circuits work, a defective ground connection should be suspected. To verify such a bad ground connection, the tester includes an auxiliary ground lead 60 which is used by inserting its plug 62 into a mating jack 64 on tester 10 and by attaching its clamp 66 to vehicle ground 42. If any of the circuits now work, a defective ground connection is verified. Thereafter, auxiliary ground lead 60 is removed before proceeding with other testing.

To proceed with a test of the trailer wiring, the operator leaves the vehicle's parking lights on, while going back to tester 10 which is still attached between the electrical cables from vehicle 22 and trailer 18. Switch $S_1$ is now moved from pole V, past its neutral position, to contact pole T. This now connects battery 40 of vehicle 22 with switch $S_2$; and the operator moves switch $S_2$, from the neutral position indicated in the drawing, to contact pole R, energizing line 32c of tester 10 and line 32d of trailer 18. This should cause all trailer running lights $R_T$ to turn on. Switch $S_2$ is then moved to pole SD, energizing wires 33c and 34c of tester 10 and wires 33d and 34d of trailer 18, turning on the filaments of both braking lamps $B_T$ and both directional lamps $DL_T$ and $DR_T$. [As indicated above, these braking and directional indications are conventionally supplied by the same filament of most combination tail lamps.] If both lights are energized, the operator knows that both are operating and will illuminate appropriately when separately or concurrently energized by either the directional or braking signals from the vehicle.

If any of the lamps are not illuminating when energized, the most common causes are a defective bulb, a defective ground, or a broken power lead for that particular lamp. Again, if any of these circuits is not working, it should be repaired. If none are working, a bad ground connection should be suspected and can be verified by using auxiliary ground lead 60, attaching clamp 66 to ground 44 of trailer 18 or, preferably, to ground 42 of towing vehicle 22.

In order to test trailer wiring systems without the presence of a towing vehicle, an auxiliary power supply 70 is provided. Either a battery 72 or a transformer/rectifier unit 74 can be selected as a power source by appropriate operation of a third single-pole/double-throw switch $S_3$ to deliver current through wire 32e. An auxiliary female plug connector 76 is attached to male plug connector 14 of tester 10 in place of connector 20 of towing vehicle 22. Connector 76 serves to deliver power through wire 32b to switch $S_1$ of tester 10, while wire 31e provides a common ground for the circuits of trailer 18 which can be checked in the manner explained above while using this auxiliary power source rather than towing vehicle 22.

Figure 2:
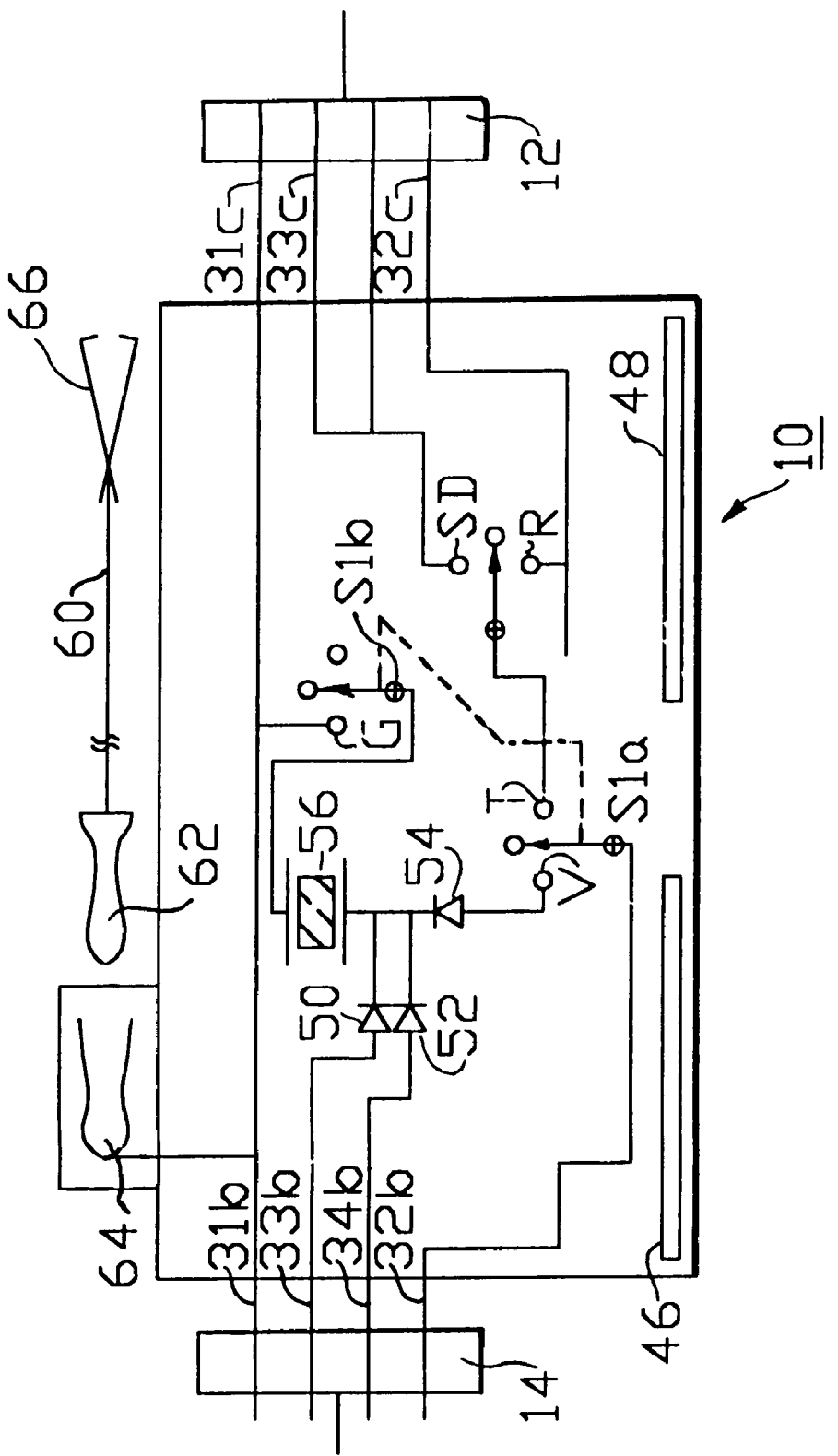
FIG. 2 shows a slight modification of the tester portion of FIG. 1, illustrating a preferred embodiment of the invention.

FIG. 2 illustrates a preferred embodiment of the invention in which tester 10 is modified slightly. Namely, single-pole/double-throw switch $S_1$ (as shown in FIG. 1 and described above) is replaced by a double-pole/double-throw switch $S_{1a}/S_{1b}$, and audio signal device 56 is placed in series with switch portion $S_{1b}$. With this arrangement, when the operator is testing the lighting system of towing vehicle 22 and moves switch portion $S_{1a}$ to contact pole V (in the manner explained above), switch portion $S_{1b}$ simultaneously contacts pole G, connecting audio signal device 56 to the common ground circuit of lines 31b and 31c. However, when the operator is testing the circuits of trailer 18 and moves switch portion $S_{1a}$ to contact pole T, switch portion $S_{1b}$ simultaneously opens the connection between audio signal device 56 and the common ground circuit, thereby disabling the operation of audio signal device 56 and preventing its inadvertent operation in the event the towing vehicle's brake or directional lights have been left in an energized condition.

I claim:

1. In portable apparatus for testing the automotive lighting systems shared by a trailer vehicle and a trailer-towing vehicle, said vehicles each having (a) a plurality of lights to indicate various conditions of vehicle operation, each said light having a respective electrical circuit, and (b) respective electrical cables including respective electrical wires in circuit with each said respective electrical circuit, said respective electrical cables being interconnectable by means of mating electrical connectors, and said trailer-towing vehicle also having a source of electrical power to energize said circuits and lights; said apparatus comprising:

a first mating electrical connector for receiving said cable from the trailer-towing vehicle to connect each said respective electrical circuit of the trailer-towing vehicle with said apparatus;

a plurality of towing vehicle tester circuits, each corresponding to a respective electrical circuit of said trailer-towing vehicle, and each being electrically isolated from the other said corresponding tester circuits;

an audio signal device for providing an audible signal whenever energized;

an OR gate in circuit with said audio signal device, each said towing vehicle tester circuit being connected with said OR gate, so that whenever any one of said respective electrical circuits of said trailer-towing vehicle is energized, said audible signal is provided;

a second mating electrical connector for receiving said cable from the trailer vehicle to connect each said respective electrical circuit of the trailer vehicle with said apparatus;

a first switch in series with said first mating electrical connector and one of said respective electrical circuits of the trailer-towing vehicle;

a second switch;

said first switch being movable to one of (a) a first position in which said one electrical circuit of the trailer-towing vehicle is connected to said OR gate and said audio signal device, and (b) a second position in which said one electrical circuit of the trailer-towing vehicle is connected to said second switch; and said second switch being movable to one of (a) a first position in which said one electrical circuit of the trailer-towing vehicle is connected to a first one of said respective electrical circuits of the trailer vehicle, and (b) a second position in which said one electrical circuit of the trailer-towing vehicle is connected to at least a second one of said respective electrical circuits of the trailer vehicle.

2. The portable testing apparatus of claim 1 further comprising a supplementary source of direct current which is selectively connectable in series with said second manual switch.

3. The portable testing apparatus of claim 2 wherein said supplementary source of direct current comprises a battery.

4. The portable testing apparatus of claim 3 wherein said supplementary source of direct current comprises switch means for selectively connecting one of (a) a battery and (b) a transformer/rectifier in series with said second manual switch.

5. The portable testing apparatus of claim 1 wherein said OR gate comprises three diodes.

6. The portable testing apparatus of claim 1 wherein said trailer-towing vehicle and said trailer vehicle each have a common electrical ground, said towing vehicle tester circuits further comprise a common ground circuit for interconnecting said common electrical grounds.

7. The portable testing apparatus of claim 6 further comprising an auxiliary ground lead connected to said common ground circuit, said common ground lead being electrically connectable to one of said vehicle common grounds.

8. The portable testing apparatus of claim 1 wherein said audio signal device is a piezoelectric sound generator.

9. The portable testing apparatus of claim 1 wherein said respective electrical circuits of said trailer-towing vehicle are connected to respective running lights, brake lights, and directional lights, and wherein, when said first mating electrical connector receives said cable from said trailer-towing vehicle, said audio signal device is energized whenever each said respective electrical circuit is energized by said power source in said trailer-towing vehicle.

10. The portable testing apparatus of claim 9 wherein said respective electrical circuits of said trailer vehicle are connected to respective running lights, brake lights, and directional lights, and wherein, when said second switch is moved to said second position, said one electrical circuit of the trailer-towing vehicle is connected to said respective electrical circuits of the trailer vehicle for said brake lights and said directional lights.

11. The portable testing apparatus of claim 1 wherein said first and second switches are manually operated.

12. The portable testing apparatus of claim 1 wherein, when said first switch is moved to said second position, said audio signal device is disabled.

13. The portable testing apparatus of claim 1 further comprising an attachment assembly for permitting said apparatus to be attached, to one of (a) said trailer or (b) said trailer-towing vehicle, in a position selected to facilitate hearing said audible signal whenever it is energized.

14. The portable testing apparatus of claim 1 wherein said attachment assembly comprises a magnetic strip.

* * * * *